Sept. 3, 1963  C. L. ENGLISH  3,102,426

PRESSURE FLUCTUATION RECORDER

Filed April 8, 1960

INVENTOR.
CHARLES L. ENGLISH
BY
ATTORNEY 3,102,426
PRESSURE FLUCTUATION RECORDER
Charles L. English, 2204 E. 25th Place, Tulsa, Okla.
Filed Apr. 8, 1960, Ser. No. 20,900
9 Claims. (Cl. 73—419)

This invention relates generally to improvements in pressure measuring devices, and more particularly, to an improved apparatus for measuring fluctuations in the pressure of a liquid stream.

As it is well known in the art, it is frequently desirable to measure the times of occurrence of fluctuations in the pressure of a liquid stream, as well as the magnitude of each fluctuation in such pressure. For example, the fluctuations in the pressure of power oil being used to operate a subsurface oil well pump provide information highly useful in the analysis of the operation of the pump. Subsurface hydraulic oil well pumps are reciprocating type pumps which utilize a valve mechanism in the engine end of the pump unit for controlling reciprocation of the pump unit. Since such pump units are installed in inaccessible positions, the performance of such a pump can be observed only indirectly. Operation of the valve mechanism of such a pump unit gives rise to sometimes rather slight variations in the pressure of the power oil used for operating the pump unit. If the times of occurrence of the fluctuations in the pressure of the power oil can be precisely determined, the efficiency of operation of the valve mechanism, and hence the pump unit, can be calculated. Also, the magnitude of the fluctuations in the pressure of the power oil are highly beneficial in the analysis of the pump operation. It should also be noted that the pressure of the power oil being fed to a subsurface hydraulic pump depends upon many factors, but principally upon the depth of operation of the pump. In shallow wells the operating pressure of the power oil at the surface may be as low as 500 pounds and, in deeper wells, the operating pressure of the power oil may be as high as 3,800 pounds. The shifting of the valve mechanism of a subsurface hydraulic pump may vary the operating pressure of the power oil as little as ten pounds. Up to the present time, no satisfactory device has been available for measuring such minute fluctuations.

Many different types and designs of pressure measuring devices have been constructed. These prior devices have utilized a pressure responsive member, such as a diaphragm, piston or tube, against which the pressure to be measured is applied. In most of these prior devices, movement of the pressure responsive member is counteracted by a spring, such that movements of the pressure responsive member may be correlated with variations in the pressure being measured. A spring or any other mechanical type of assembly used for resisting movement of the pressure responsive member is inherently limited, both in the range of pressures which may be measured and in sensing the magnitude of the fluctuations of the pressure. When using a pressure measuring device having a spring as a pressure resisting member, a sensitivity of five percent is considered excellent. In other words, such prior devices will ordinarily not provide a measurement of fluctuations amounting to less than five percent of the average pressure being measured. Also, a mechanical resisting or counteracting system provides an inherent time delay between a change in pressure and response of the device.

The present invention contemplates a novel pressure responsive device utilizing a piston as the pressure responsive member exposed to the pressure being measured and which is counterbalanced by the pressure of a confined body of gas. The pressure of the gas may be adjusted as desired when the apparatus is initially installed on a liquid flow line to regulate the sensitivity of the apparatus. In a preferred embodiment, the gas is maintained in a gas cavity against a flexible membrane and the pressure of the gas is applied to the piston type pressure responsive member through a liquid column to provide the maximum adaptability of the apparatus. The membrane is of a type which will not resist variations in the volume of the body of gas, and the volume and pressure of the gas may be easily adjusted by adding to or subtracting from the liquid column extending from the membrane to the piston member.

In its broader aspects, the present invention may be defined as an apparatus for measuring the pressure fluctuations in a liquid flow line, comprising a housing having a piston chamber therein communicating with one end of the housing, said piston chamber being reduced in diameter adjacent said one end of the housing, a piston slidingly sealed in the larger diameter portion of said piston chamber and being responsive to differential pressures on the opposite ends thereof for reciprocation in said piston chamber, a rod connected to said piston and slidingly sealed in the reduced diameter portion of said piston chamber, means connected to said rod for registering the movements of said piston, means for imposing flow line pressure on one end of said piston, a confined body of gas, and means for imposing the pressure of said body of gas against the opposite end of said piston.

An important object of this invention is to precisely measure the occurrence of pressure fluctuations in a liquid flow line, and particularly in a liquid flow line having a relatively high average pressure.

Another object of this invention is to measure the magnitude of the pressure fluctuations in a liquid flow line.

A further object of this invention is to provide an apparatus for measuring the pressure fluctuations in a liquid flow line wherein movement of the pressure responsive member is resisted by the pressure of a body of gas.

Another object of this invention is to provide an apparatus for measuring the pressure fluctuations in a liquid flow line which does not require the use of springs or other mechanical elements for counteracting the pressure of the liquid being measured.

Another object of this invention is to provide an apparatus for measuring the pressure fluctuations in a liquid flow line utilizing a piston as the pressure responsive member movable upon fluctuations in the flow line pressure, wherein minute fluctuations in the pressure of the flow line result in substantial movements of the piston.

A still further object of this invention is to provide an apparatus for measuring the pressure fluctuations in a liquid flow line which is simple in construction, may be economically manufactured and which will have a long service life.

Other objects and advantages of the invention will be evident from the following detailed description, when read in conjunction with the accompanying drawings which illustrate my invention.

Figure 2:
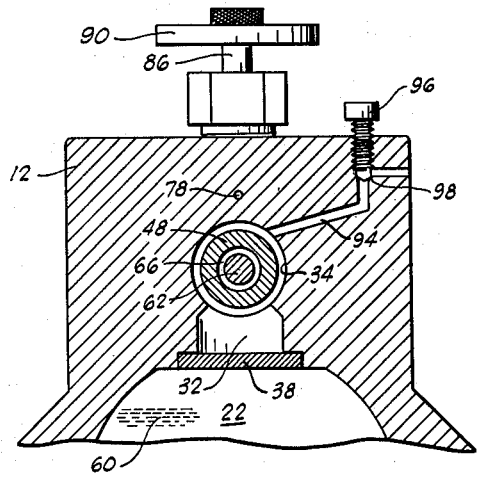
FIGURE 2 is a partial sectional view as taken along lines 2—2 of FIG. 1.

Referring to the drawings in detail, reference character 10 generally designates an apparatus constructed in accordance with this invention which includes a body 12 having an enlarged portion 14 extending downwardly and outwardly from the remainder of the body 12. A cover 16 is secured around the lower end of the body portion 14 by suitable threads 18, and a divider in the form of a flexible membrane 20 is secured between the mating end faces of the cover 16 and body portion 14. The membrane 20 extends across a substantially spherically-shaped cavity 22 formed by a recess 24 in the lower end of the body portion 14 and a recess 26 in the upper face of the cover member 16. The membrane 20 may be formed of any flexible material which is substantially impervious to gas, but which may be flexed or bent without the application of any appreciable force. For example, the membrane 20 may be any suitable rubberized or plastic material. The outer edge 28 of the membrane 20 is sealingly secured between the mating end faces of the body portion 14 and cover 16, and the membrane 20 is of a size to lay along either the walls of the recess 24 or the walls of the recess 26. The purpose of the membrane 20 is to confine a body of gas 30 in the lower portion of the cavity 22 and to move vertically in the cavity 22 upon variations in the pressure of the gas 30, as will be more fully hereinafter set forth.

A bore 32 extends vertically upward from the central portion of the recess 24 into communication with a bore 34 extending transversely through the body portion 12 above the lower enlarged portion 14. A counterbore 36 is formed at the lower end of the bore 32 to receive a porous plate 38. The plate 38 may be formed of any suitable material which will not substantially restrict the flow of liquid therethrough and yet will prevent the membrane 20 from being distorted into the bore 32 during operation of the apparatus 10, as will be described. The porous plate 38 may be secured in the counterbore 36 in any desired manner, such as by the use of cement or glue.

The transverse bore 34 extends through an extension 39 secured to one end 40 of the body 12 by bolts 41 and is reduced in diameter within the extension 39 to form an inwardly facing shoulder 42. The opposite end 44 of the transverse bore 34 is threaded for connection of a cap member 46 which effectively closes off the respective end of the bore 34, for purposes to be described.

A sleeve or cylinder 48 is positioned in the transverse bore 34 to slidingly support a piston member 50 in the apparatus 10. The sleeve 48 is provided with a head portion 52 of a size to fit closely in the bore 34 in abutting relation with the shoulder 42 in the bore 34. Longitudinally spaced sealing rings 54, such as O-rings, are secured in mating grooves around the head portion 52 to provide a seal of the sleeve 48 in the bore 34, as will be described. The main body portion 56 of the sleeve 48 has an outer diameter less than the diameter of the transverse bore 34 to provide an annular passageway from the vertical bore 32 around the sleeve 48 into the cap member 46. It should also be noted that a boss 58 is formed on the end 59 of the piston member 50 to limit movement of the piston member 50 in one direction upon contact with the cap member 46. Thus, communication between the end 59 of the piston member 50 and the upper portion of the gas cavity 22 is established, as will be described. It may be noted here, however, that a body of liquid 60 is positioned in the cap member 48, the bore 34, the bore 32 and in the upper portion of the gas cavity 22 above the membrane 20 to transfer the pressure of the body of gas 30 against the end 59 of the piston 50.

The piston member 50 is slidingly sealed in the sleeve 48 for lengthwise movement in the sleeve 48 in response to differential pressures on the opposite ends thereof. In a preferred embodiment, the piston 50 forms a metal-to-metal seal with the inner periphery of the sleeve 48 in preference to the use of piston sealing rings to minimize the force required for moving the piston. A rod 62 is secured to one end 64 of the piston 50 and extends beyond the extension 39 of the body 12 to facilitate registration of the movements of the piston 50, as will be described. It will therefore be apparent that the bore 66 of the sleeve 48 forms a piston cavity for the piston member 50. Also, the inner diameter of the sleeve 48 is preferably reduced at a point between the sealing rings 54 to provide a reduced diameter portion 68 of a size to slidingly receive the rod 62. It may also be noted that the rod 62 is preferably sealed in the reduced diameter portion 68 of the sleeve 48 by a metal-to-metal seal.

A plurality of radial ports 70 are formed through the head portion 52 of the sleeve 48 in positions to communicate with the piston chamber 66 adjacent the reduced diameter portion 68 of the sleeve. A circumferential groove 72 is formed around the outer periphery of the head portion 52 between the sealing rings 54 in communication with the ports 70. An inlet 74 is formed in the body 12 in alignment with the annular groove 72 and the ports 70 to receive the flow line 76 containing the liquid being measured. In a commercial installation of the apparatus 10, the member 76 will be a suitable connector communicating with the liquid flow line, such that the pressure of the liquid in the flow line will be constantly communicated through the annular groove 72, ports 70 and piston cavity 66 against the smaller end 64 of the piston member 50. It may also be noted that the inlet 74 is threaded or otherwise suitably adapted for connection with the flow line 76.

An equalizing passageway 78 extends through the body 12 from the inlet 74 through a valve chamber 80 to the transverse bore 34 adjacent the inner end of the cap member 46. A valve holder 82 is secured in the body 12 to support a valve 84 in the chamber 80. A valve stem 86 extends upwardly from the valve 84 and is threadedly secured in the holder 82 by threads 87 for raising and lowering the valve 84 upon turning movement of the stem 86 in a manner common to the art. A suitable sealing ring 88 may be secured in the holder 82 around the stem 86 above the threads 87 to prevent the possibility of leakage upwardly through the holder 82, if desired. Also, a knob 90 is preferably secured on the stem 86 above the holder 82 to facilitate the rotation of the stem 86 and operation of the valve 84. It will be apparent that when the valve 84 is raised to the position shown in FIG. 1, the equalizing passageway 78 will be open for the transfer of the pressure of the flow line 76 to the bore 34. Conversely, when the valve 84 is seated on the seat 92, the passageway 78 will be closed.

As shown most clearly in FIG. 2, a bleed-off passageway 94 extends through the body 12 from the bore 34 adjacent the head portion 52 of the sleeve 48 to the exterior of the body 12. Any suitable valve member 96 may be secured in the body 12 for cooperating with a valve seat 98 formed in the medial portion of the passageway 94 to open and close the passageway 94, as will be readily understood by those skilled in the art. For example, the valve 96 may be in the form of a screw simply threaded into the body 12 for movement toward and away from the seat 98. It will therefore be apparent that a portion of the liquid 60 may be removed through the bleed-off passageway 94 to reduce the pressure imposed on the gas 30 through the membrane 20, which is particularly useful when adjusting the apparatus 10, as will be described.

Any suitable registering apparatus 100 (see FIG. 1), such as a recorder, may be associated with the piston rod 62 to register the position and movements of the piston member 50. In one form of the invention, the register 100 comprises a suitable box 102 secured to the extension 39 of the housing 12 by suitable screws 104 in such a position that the rod 62 extends into the box 102. A chart 106 is supported in the box 102 by suitable drive rollers 108. Any suitable drive (not shown) may be used for turning the rollers 108, to in turn move the chart 106 lengthwise in the box 102. A scriber 110 is secured on the outer end of the rod 62 in a position to engage the chart 106 and provide a record of the movements of the piston member 50 on the chart.

*Operation*

Prior to installation of the apparatus 10, the gas 30 is injected into the portion of the gas cavity 22 between the membrane 20 and recess 26 formed in the cover 16 at a pressure depending upon the expected average pressure of the liquid to be measured, the sizes of the opposite ends 59 and 64 of the piston member 50, and the volume of the gas cavity 22. For example, assuming that the average pressure in the liquid flow line 76 is expected to be 2,500 pounds, and the cross sectional sizes of the opposite ends 59 and 64 of the piston member 50 are 0.1 and 0.05 square inch, and assuming further that the volume of the gas cavity 22 is ten cubic inches, then the pressure of the gas 30 may be in the range of 1,014.7 p.s.i.a. In this example, the scriber 110 will be moved approximately one-half inch upon a variation in the pressure of the flow line 76 of approximately fifteen pounds, as will be described more in detail below.

The gas 30 may be injected into the gas cavity 22 in any desired manner until the desired pressure is reached. It will be apparent that at this time the membrane 20 will be pressed against the walls of the recess 24 and across the bore 32. However, the porous plate 38 forms a support for the membrane 20 across the bore 32 and will prevent damage to the membrane.

When the inlet 74 is placed in communication with the flow line 76, liquid from the flow line will flow through the inlet 74, groove 72 and the ports 70 into the piston cavity 66 in contact with the smaller end 64 of the piston member 50. The pressure of the liquid from the flow line 76 will therefore move the piston member 50 to the left, as viewed in FIG. 1, until the boss 58 on the piston member 50 contacts the end of the cap member 46. Assuming the bleed-off valve 96 is closed, the equalizing valve 84 is then opened to direct liquid 60 from the flow line 76 through the equalizing passageway 78 into the transverse bore 34 around the sleeve 48. This liquid also flows through the cap member 46 against the larger end 59 of the piston member 50, as well as downwardly through the vertical bore 32 and porous plate 38 into the upper end portion of the gas cavity 22. It will be apparent that since this liquid, which has been designated by reference character 60, has a greater pressure than the gas 30, the resulting pressure will force the membrane 20 downwardly in the gas cavity 22 and partially compress the gas 30 until the pressure of the gas is equal to the pressure of the liquid. Simultaneously, the liquid 60 will react on the larger end 59 of the piston member 50 and move the piston member 50 to the right, as viewed in FIG. 1, until the scriber 110 is adjacent the opposite edge of the chart 106, as indicated by dashed lines in FIG. 1.

When the pressure of the liquid 60 and the pressure of the gas 30 are equalized, the equalizing valve 84 is closed to prevent further communication between the inlet 74 and the liquid 60 standing in the bore 34. The bleed-off valve 96 is then opened to bleed off a portion of the liquid 60. It will be apparent that as a portion of the liquid 60 is removed, the pressure on the larger end 59 of the piston member 50 is reduced and the scriber 110 will move from the dash line position shown in FIG. 1 toward the solid line position. Simultaneously, the gas 30 will expand in the gas cavity 22 and tend to move the membrane 20 toward the porous plate 38 to occupy the space provided by removal of a portion of the liquid 60. In a preferred use of the apparatus, a sufficient amount of the liquid 60 is bled off through the passageway 94 to move the scriber 110 to the center of the chart 106, such that the center of the chart 106 will be indicative of the average pressure in the flow line 76. The bleed-off valve 96 is closed when the scriber 110 has been moved to the desired position with respect to the chart 106.

In most applications of the apparatus 10, as exemplified in a use for measuring the pressure fluctuations of the power oil in a subsurface hydraulic pump installation, the pressure in the flow line 76 will fluctuate both above and below the average pressure. When the pressure in the flow line 76 increases above the average, the increased pressure is transmitted through the groove 72, ports 70 and through the piston cavity 66 against the smaller end 64 of the piston member 50. This increased force on the piston member 50 will move the piston member 50 against the pressure of the gas 30 (through the medium of the liquid 60) and cause a compression of the gas 30. When the pressure of the gas 30 applied through the liquid 60 against the larger end 59 of the piston member 50 is at the proper value with respect to the pressure of the flow line being applied against the smaller end 64 of the piston member, the piston member 50 will become balanced and will remain in such position. In a typical application, as indicated above, the larger end 59 of the piston member 50 is twice the size of the smaller end 64. Therefore, the forces across the piston member 50 are balanced when the pressure of the gas 30 is equal to one-half the pressure of the flow line 76.

Figure 1:
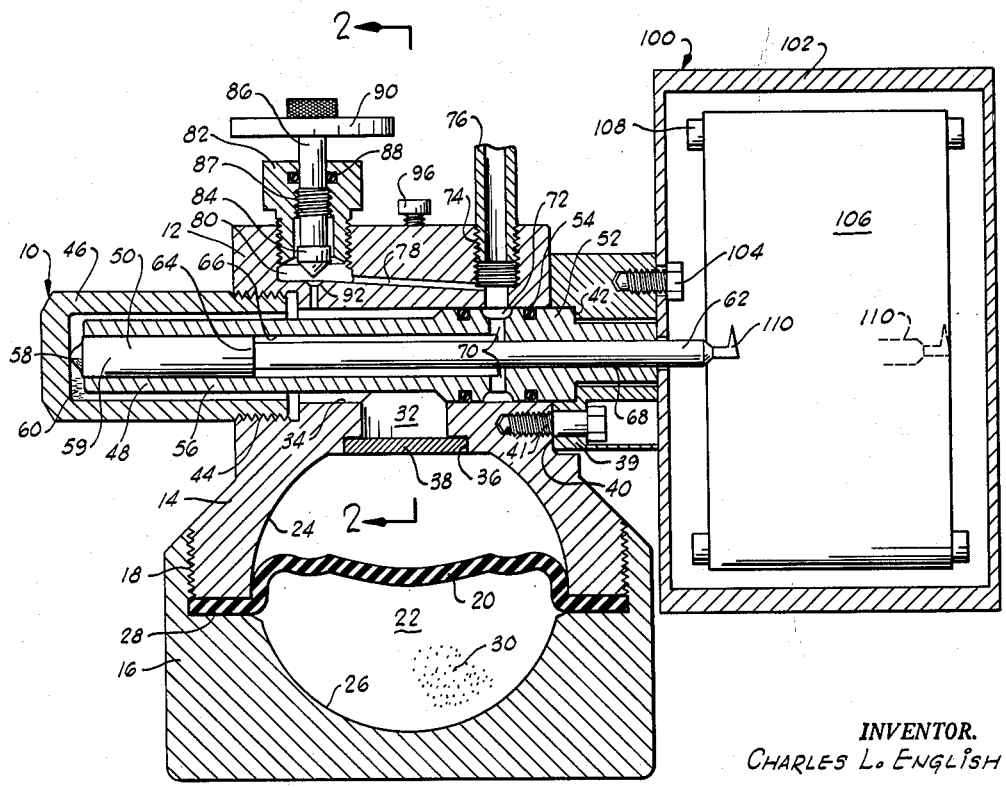
FIGURE 1 is a vertical sectional view through an apparatus constructed in accordance with this invention, with portions of the apparatus shown schematically to more clearly illustrate the invention.

When the pressure of the flow line 76 is reduced, the force imposed on the gas 30 through the liquid 60 is likewise reduced, such that the gas 30 tends to expand and move the piston member 50 to the right as viewed in FIG. 1 (through the medium of the liquid 60) until the forces on the piston member 50 are again balanced.

Since the pressure of the gas 30 is applied hydraulically against the piston member 50, movement of the piston member 50 will be substantially instantaneous upon a variation in the pressure in the flow line 76. In other words, the time delay between movement of the scriber 110 and a fluctuation in the pressure of the flow line 76 will be reduced to a minimum, such that a graph provided by the scriber 110 on the chart 106 will provide a true representation of the fluctuations in the pressure of the flow line 76 with respect to time. It will be understood that the chart 106 is driven at a uniform speed during operation of the apparatus 10. The only portion of the apparatus 10 tending to provide a time lag between a pressure fluctuation and movement of the scriber 110 is the physical movement of the piston member 50. In a commercial application of the present invention, the piston member 50 will be of relatively small size, such as a tenth of a square inch in cross section, to provide a lightweight member responsive to minute pressure differentials across the opposite ends thereof. It will also be apparent that since the membrane 20 applies no force on the gas 30, the membrane will not affect the time response of the apparatus 10.

When the precise pressure of the gas 30 injected in the cavity 22 is known, movement of the scriber 110 upon predetermined fluctuations in the pressure in the flow line 76 may be easily calibrated, since the pressure-volume relation of the gas 30 will be substantially equal at all pressures of the gas. Also, since the size of the piston member 50 is known, the amount of compression and expansion of the gas 30 per unit of movement of the scriber 110 is known. And, the smaller the piston member 50, the greater will be the movement of the scriber 110 upon a predetermined fluctuation in the pressure in the flow line 76. As indicated above, the scriber 110 may be designed for a movement of one-half inch upon a variation of fifteen pounds in the pressure in the flow line 76, even when the average pressure in the flow line 76 is 2,500 pounds. Therefore, any desired magnitude of fluctuations may be measured, regardless of how high the average pressure in the liquid flow line 76 may be.

From the foregoing it will be apparent that the present invention provides a novel apparatus for measuring the pressure fluctuations in a liquid flow line utilizing a piston member as the pressure responsive member, and wherein movement of the pressure responsive member is resisted solely by a body of gas. The present apparatus requires the use of no springs or other mechanical compensating systems for resisting movement of the pressure responsive member. The apparatus will be substantially instantaneously responsive to fluctuations in the pressure in a liquid flow line, such that apparatus being operated by the liquid subject to pressure fluctuations may be precisely analyzed. It will also be apparent that both the occurrence and magnitude of pressure fluctuations may be measured, regardless of the average operating pressure of the liquid flow line connected to the apparatus. It will further be apparent that the present apparatus is simple in construction, may be economically manufactured and will have a long service life.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

I claim:

1. Apparatus for measuring the pressure fluctuations in a liquid flow line, comprising a housing having an elongated chamber therein, a piston slidingly sealed in said chamber for reciprocation in said chamber in response to differential pressures on the opposite ends thereof, an inlet in said housing communicating with one end of said chamber and adapted for connection with the flow line for imposing the flow line pressure on one end of the piston, a gas cavity having a closed end and an open end, a movable gas-impervious divider sealed across the gas cavity, a body of gas in the cavity between the divider and the closed end of the cavity, means forming a passage from the open end of said cavity to the end of said chamber opposite said one end, a body of liquid extending from said divider through said passage to the end of the piston associated with said opposite end of said chamber to impose the pressure of said gas against said piston in a direction opposite to the action of the flow line pressure, and means for registering all reciprocating movements of the piston.

2. Apparatus as defined in claim 1 characterized further to include a bypass extending from said inlet to said passage, and a valve in said bypass for adjusting the pressure of said gas in accordance with the expected average flow line pressure to be measured.

3. Apparatus as defined in claim 1 wherein the end of said piston exposed to flow line pressure is smaller than the opposite end thereof.

4. Apparatus as defined in claim 3 characterized further to include a bypass extending from said inlet to said passage for imposing flow line pressure on said gas, a valve in said bypass for stopping communication between said inlet and said passage, and a valved bleed-off passageway communicating with said passage for reducing the pressure imposed on said gas and positioning said piston at the desired position in said chamber.

5. Apparatus as defined in claim 1 wherein said divider comprises a flexible membrane having the outer edges thereof sealed to the inner periphery of said cavity.

6. Apparatus for measuring the pressure fluctuations in a liquid flow line, comprising: a housing having a piston chamber therein communicating with one end of the housing, said piston chamber being reduced in diameter adjacent said one end of the housing, a gas cavity carried by said housing and having an open end and a closed end, a piston slidingly sealed in the larger diameter portion of said piston chamber and being responsive to pressure differentials on the opposite ends thereof for reciprocation in said piston chamber, a rod connected to said piston and slidingly sealed in the reduced diameter portion of said piston chamber, means connected to said rod for registering the movements of said piston, an inlet communicating with the end of the larger diameter portion of said piston chamber associated with the end of said piston connected to said rod, a flexible membrane secured across said gas cavity, an expandable body of gas positioned in said gas cavity between said membrane and the closed end of the cavity for flexing said membrane upon variations in the pressure of said body of gas, a passage extending from the open end of said gas cavity to the end of the larger diameter portion of said piston chamber opposite said inlet, and a body of liquid extending from said membrane through said passage to the respective end of said piston.

7. Apparatus as defined in claim 6 characterized further to include valved passageways in said housing communicating with said inlet, said passage and the exterior of said housing for adjusting the position of said piston preliminary to measurements of fluctuations in the flow line pressure.

8. Apparatus as defined in claim 7 wherein said valved passageways comprise a valved equalizing passageway communicating with said inlet and said passage for imposing the flow line pressure on said gas, and a valved bleed-off passageway extending from said passage to the exterior of said housing for bleeding off a portion of said body of liquid and reducing the pressure imposed on said gas to position said piston at an intermediate position in said piston chamber preliminary to measurements of fluctuations in the flow line pressure.

9. Apparatus as defined in claim 6 wherein said gas cavity is spherical in cross section, said membrane is secured across the central portion of said cavity and is of a size to lay along the walls of said cavity across the open end of said cavity without stretching, and characterized further to include a porous plate secured across the open end of said cavity to retain said membrane within said cavity.

References Cited in the file of this patent

UNITED STATES PATENTS

| 1,513,022 | Bahnmayer | Oct. 28, 1924 |
| 2,382,547 | De Juhasz | Aug. 14, 1945 |
| 3,020,764 | Joline | Feb. 13, 1962 |
| 3,047,022 | Aldinger | July 31, 1962 |

FOREIGN PATENTS

| 35,483 | Norway | Aug. 7, 1922 |
| 45,632 | France | Aug. 12, 1935 |
| | (Addition to No. 757,515) | |